United States Patent
Ganesan et al.

(10) Patent No.: US 8,522,178 B2
(45) Date of Patent: Aug. 27, 2013

(54) RE-MODELING A MEMORY ARRAY FOR ACCURATE TIMING ANALYSIS

(75) Inventors: Raghuraman Ganesan, San Ramon, CA (US); Matthew J. T. Page, San Jose, CA (US)

(73) Assignee: Apple Inc., Cupertino, CA (US)

( * ) Notice: Subject to any disclaimer, the term of this patent is extended or adjusted under 35 U.S.C. 154(b) by 49 days.

(21) Appl. No.: 13/227,017

(22) Filed: Sep. 7, 2011

(65) Prior Publication Data

US 2013/0061192 A1    Mar. 7, 2013

(51) Int. Cl.
*G06F 17/50* (2006.01)

(52) U.S. Cl.
USPC ......................................... 716/108; 716/106

(58) Field of Classification Search
USPC .................................................. 716/104–110
See application file for complete search history.

(56) References Cited

U.S. PATENT DOCUMENTS

| | | | |
|---|---|---|---|
| 8,065,646 B2 | 11/2011 | Priel et al. | |
| 8,120,960 B2 | 2/2012 | Varkony | |
| 8,271,825 B2 | 9/2012 | Gomm et al. | |
| 8,307,313 B2 | 11/2012 | Baumgartner | |
| 2002/0125585 A1* | 9/2002 | Slamowitz et al. | 257/903 |
| 2002/0163838 A1* | 11/2002 | Guterman et al. | 365/185.28 |
| 2009/0103390 A1* | 4/2009 | Kim et al. | 365/230.05 |

* cited by examiner

*Primary Examiner* — Binh Tat
(74) *Attorney, Agent, or Firm* — Lawrence J. Merkel; Jason L. Burgess; Meyertons, Hood, Kivlin, Kowert & Goetzel, P.C.

(57) ABSTRACT

A system and method for analyzing the timing requirements of a memory array are disclosed. The memory cell circuitry used in the original memory array may utilize two bi-directional passgate transistors which are both used during read and write operations on the memory cell, e.g., where signals can flow across the passgate transistors in two directions. A model of the memory array may be created according to a memory cell model that uses uni-directional passgate transistors. Modeling the memory array with uni-directional circuitry may enable a static timing analysis tool to determine the critical path through the memory array. Once the critical path has been determined from the model of the memory array, a dynamic simulation of the critical path in the original memory array may be performed to accurately determine the timing requirements of the original memory array.

23 Claims, 12 Drawing Sheets

RE-MODELING A MEMORY ARRAY FOR ACCURATE TIMING ANALYSIS

BACKGROUND

1. Field of the Invention

This application is related to the field of circuit design, and more particularly to a software tool and method for accurately analyzing the timing requirements of a memory array.

2. Description of the Related Art

High-performance digital circuits have traditionally been characterized by the clock frequency at which they operate. Gauging the ability of a circuit to operate at the specified clock frequency requires an ability to measure the time it takes for signals to traverse paths through the circuit. While such timing measurements can theoretically be performed using a dynamic circuit simulation on a computer system, such an approach is often too slow or requires too many computing resources to be practical, especially if the circuit has a complex design.

Static timing analysis is a technique for computing the expected timing of a digital circuit without requiring a dynamic simulation. Static timing analysis generally involves traversing all the paths between endpoints in a circuit to determine the traversal time for each path by examining the timing characteristics of the hardware elements used in the path. The path that has the longest delay is referred to as the critical path. Static timing analysis plays a vital role in facilitating the fast and reasonably accurate measurement of circuit timing Many digital circuits use memory arrays that are implemented as rows and columns of memory cells, where each cell stores a single bit. Memory arrays can have hundreds or thousands of memory cells. Because of their large size and the properties of the circuitry used to implement the cells, memory arrays can present problems for both dynamic simulation and static timing analysis. This can make it difficult to find the critical path through a memory array, which may in turn make it difficult to accurately analyze the timing requirements of a circuit that uses the memory array.

SUMMARY

Various embodiments of a system and method for analyzing the timing requirements of a memory array are described. The memory array may have a circuit design that is too large to simulate in a traditional dynamic simulation, e.g., because of the time or computing resources that would be required to perform the simulation. The circuit design of the memory array may also be difficult for conventional static timing analysis tools to correctly analyze. Embodiments of the system and method may be used to re-model the memory array to enable a static timing analysis tool to accurately analyze the memory array. A static timing analysis may be performed on the re-modeled memory array to find the critical path through the memory array. In some embodiments a transistor-level static timing analysis may be performed to find the critical path. Once the critical path has been determined from the re-modeled memory array, the system and method may operate to perform a dynamic simulation of the critical path of the original memory array using the original circuit design for the critical path, e.g., without simulating memory array circuitry not used in the critical path. The dynamic simulation of the critical path may enable the timing requirements of the original memory array to be accurately determined. Further embodiments of the system and method may operate to use the determined timing requirements of the memory array in a timing analysis of a higher-level circuit that includes the memory array, e.g., by performing a gate-level static timing analysis where the memory array is represented as a component having the timing requirements that were determined from the dynamic simulation.

The memory cell design used in the original memory array may utilize two bi-directional passgate transistors which are both used during read and write operations on the memory cell, e.g., where signals can flow across the passgate transistors in two directions. The re-modeled memory array may use a changed memory cell model that uses uni-directional passgate transistors. According to some embodiments, each memory cell may be re-modeled to include a uni-directional read passgate transistor that controls read operations into the memory cell and a uni-directional write passgate transistor that controls write operations out of the memory cell.

The memory cell model used in the re-modeled memory array may in effect split the memory cell into two sides, where one side is used for read operations and is controlled by the uni-directional read passgate transistor, and the other side is used for write operations and is controlled by the uni-directional write passgate transistor.

The re-modeled memory array may also used a changed or improved model for the sense-amps of the memory array. In some embodiments each sense-amps may be modeled as a domino logic gate connected to a uni-directional bitline signal for a respective column of memory cells.

BRIEF DESCRIPTION OF THE DRAWINGS

The following detailed description makes reference to the accompanying drawings, which are now briefly described.

Figure 1:
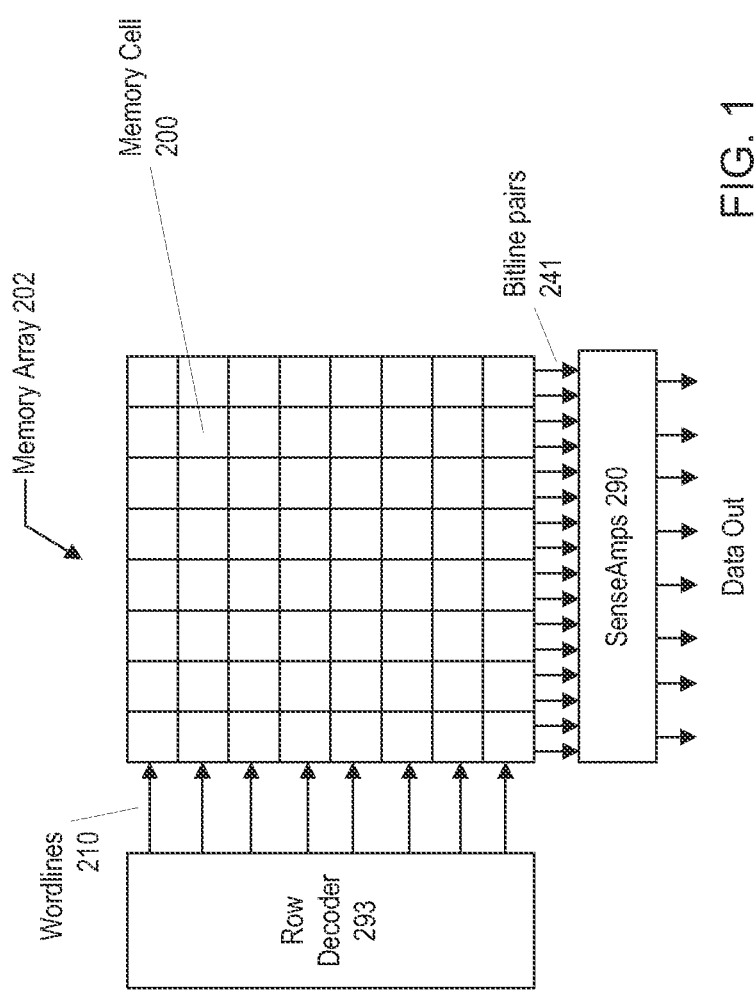
FIG. 1 illustrates an example of a memory array according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

FIG. 1 illustrates an example of a memory array 202 according to one embodiment. The memory array 202 may be designed as a set of rows and columns, where the intersection of each row and column defines a respective memory cell 200 that can store a single bit of information, e.g., a value of "0" or "1". Each row of the memory array may represent a respective unit of information referred to as a word, where the cells in the row represent the bits of the word. Thus, the number of rows may define the number of words that can be stored in the memory array, and the number of columns may define the width of each word. FIG. 1 illustrates an 8×8 example of a memory array that can store eight 8-bit words, but a typical memory array may be much larger in actual practice.

For each row in the memory array, a respective signal line referred to as a word-line may be connected to each of the cells in the row, as illustrated by the word-lines 210 in FIG. 1. For each column in the memory array, a pair of signal lines referred to as bitline and bitline-bar (abbreviated herein as BL and BL') may be connected to each of the cells in the column, as illustrated by the bitline pairs 241. The BL and BL' signal lines are the inverse of each other so that they signal the opposite logic value from each other. The word-lines 210 may be used to select which word (which row of memory cells) should be read from or written to. For example, the row decoder 293 may receive address information specifying a row in the memory array and assert the respective word-line for the specified row.

In a read operation, the assertion of the word-line for the specified row may cause the values stored in each of the cells in the row to be read by the sense-amps (sense amplifiers) 290. For each column in the asserted row, the cell value for that column may be picked up by one of the bitlines in the pair of bitlines (BL and BL') connected to the column. Each pair of bitlines in each column may be connected to a respective sense-amp 290 that senses the difference in the bitlines to determine the bit value for the respective column and outputs the value to other logic in the circuit. Thus, all of the column bits for the specified row or word can be read and output by the sense-amps 290. In a write operation, the assertion of the word-line for the specified row may cause a respective data value for each bit in the word to be stored in the corresponding column cell, overriding the value that was previously stored there.

In various embodiments the memory cells 200 may be of various types. In some embodiments the memory cells 200 may use a static random-access memory (SRAM) implementation. In a typical SRAM implementation, the bit in each memory cell 200 is stored on four transistors that form two cross-coupled inverters. The SRAM cell has two stable states that are used to denote "0" and "1" data values. Two additional transistors referred to as access transistors or passgate transistors serve to control the access to the memory cell during read and write operations. Thus, six transistors may be used in the design of each memory cell in some embodiments.

Figure 2:
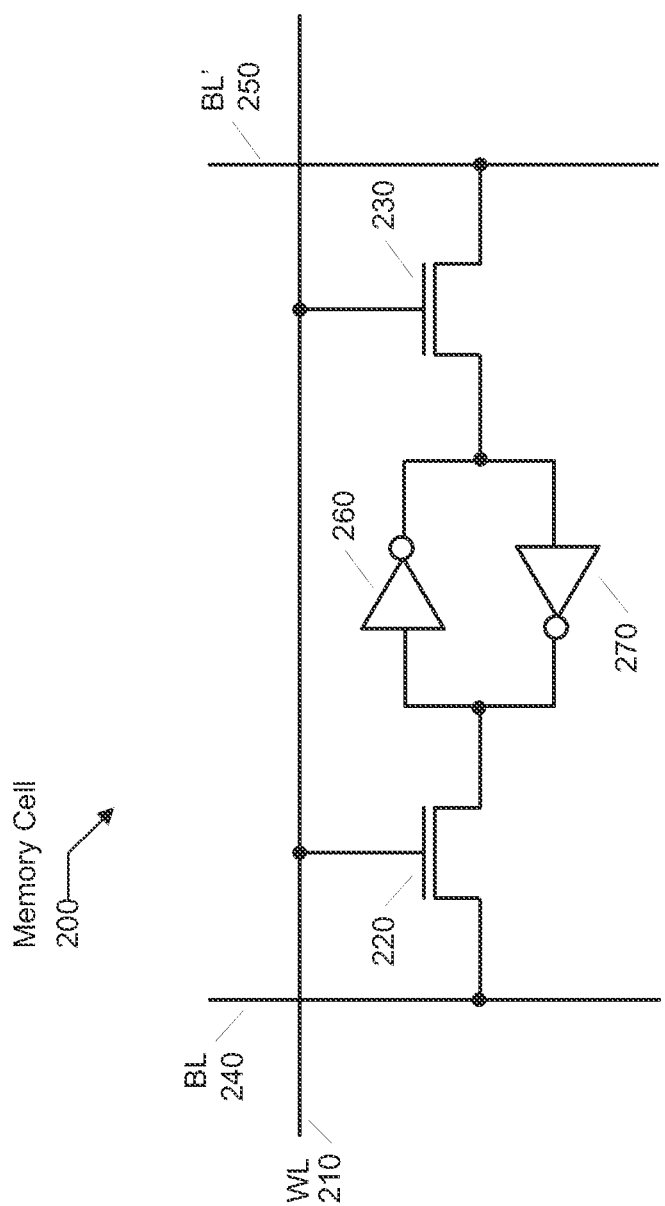
FIG. 2 illustrates an example of an original circuit design for memory cells of the memory array.

FIG. 2 illustrates an example of an embodiment in which a memory cell 200 is implemented according to a typical six-transistor SRAM design. Access to the memory cell 200 is enabled by the word-line (WL) 210 which controls the two passgate transistors 220 and 230. The two passgate transistors 220 and 230 control whether the two cross-coupled inverters 260 and 270 are connected to the bitlines BL 240 and BL' 250. The bitlines BL 240 and BL' 250 are used both to transfer data into the memory cell 200 for read operations and to transfer data out of the memory cell 200 for write operations. The two inverters 260 and 270 may each include two transistors (not shown). The two transistors of each inverter 260 and 270 along with the passgate transistors 220 and 230 constitute the six transistors of the memory cell 200 in this embodiment.

The memory cell 200 can have three possible states: standby, read, and write. In the standby state, a signal along the word-line 210 is not asserted. As a result, the passgate transistors 220 and 230 disconnect the memory cell 200 from the bit lines BL 240 and BL' 250. The two cross coupled inverters 260 and 270 continue to reinforce each other to maintain the bit value stored in the cell as long as they are disconnected from the bit lines BL 240 and BL' 250.

The read state occurs during a read operation to read the value stored in the memory cell. In the read state, the bit lines BL 240 and BL' 250 are pre-charged to a high voltage state. A signal along the word-line 210 is then asserted, thereby enabling both of the passgate transistors 220 and 230. Suppose that the memory cell 200 stores a logical "1" value as Q. In this case, the values in the inverters 260 and 270, i.e. Q and Q', are transferred to the bit lines BL 240 and BL' 250 by leaving BL 240 at its pre-charged value and discharging BL' 250, through the passgate transistor 230 and the NFET of the inverter 260, to a logical "0" or low voltage state. On the BL 240 side, the voltage of bit line BL 240 is pulled towards VDD, i.e. a logical "1" or high voltage state, by the passgate transistor 230 and a PFET of the inverter 270. If the content of the memory cell were a logical "0", i.e. Q=0, then the opposite situation would occur with the bitline BL' 250 being pulled toward a logical "1" or high voltage state and bit line BL 240 being discharged towards a logical "0" or low voltage state.

The write state occurs during a write operation to store a value in the memory cell 200. The start of a write cycle begins by applying the value to be written to the bit lines BL 240 and BL' 250. If a "0" value is to be written to the memory cell 200, a "0" value is applied to the bit lines, e.g., setting bitline BL' 250 to a logical "1" or high voltage state and bitline BL 240 to a logical "0" or low voltage state. If a "1" value is to be written to the memory cell 200, then the bitline BL' 250 may be set to a logical "0", and the bitline BL 240 to a logical "1". A signal along the word-line 210 is then asserted, and the value from the bitline BL 240 is latched in to the memory cell 200. The bit line input drivers may be designed to be stronger than the relatively weak transistors in the memory cell 200 itself, so that they can easily override the previous state of the cross-coupled inverters 260 and 270. A relatively smaller size for the transistors in the memory cell 200 may be selected so as to ensure proper operation.

Figure 3:
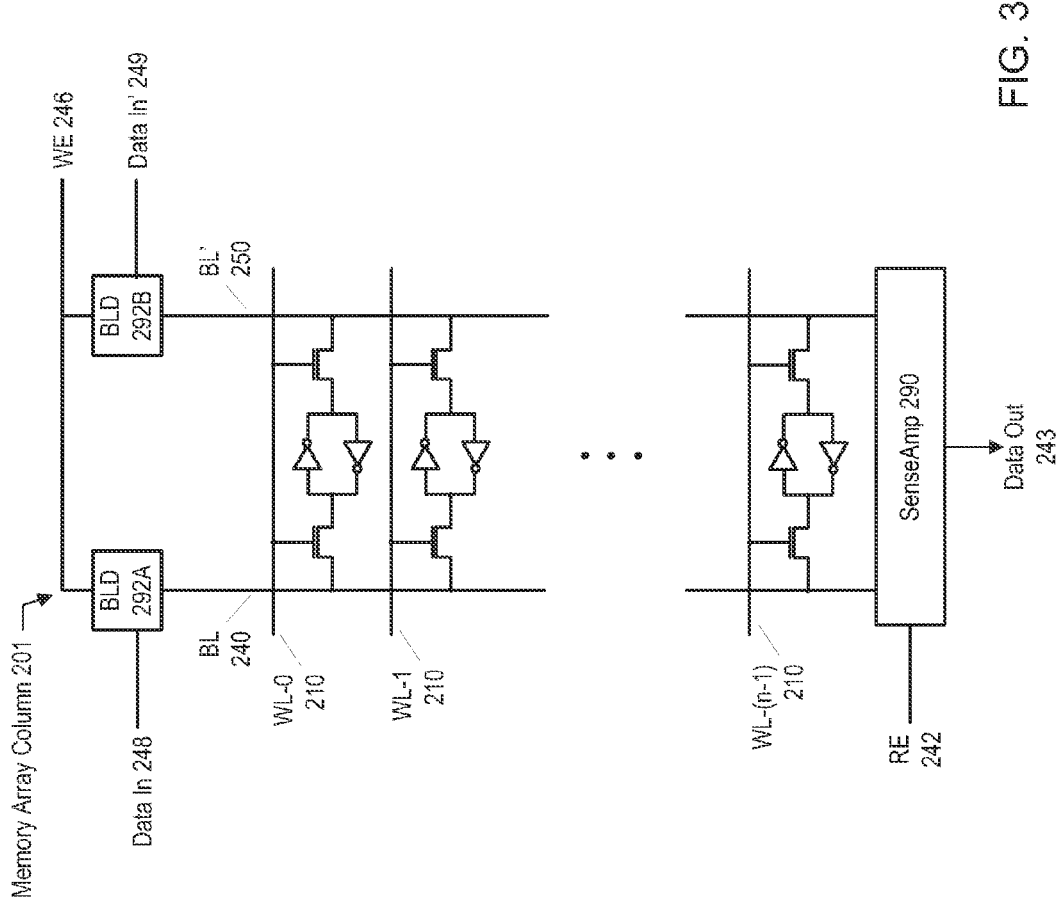
FIG. 3 illustrates a column in the memory array, where each memory cell in the column uses the original memory cell design of FIG. 2.

Each memory cell 200 of the memory array 202 may be implemented using the same design. FIG. 3 illustrates a column 201 in the memory array 202, where "n" is the number of memory cells 200 in the column, and where each cell uses the design shown in FIG. 2. A respective word-line is connected to each memory cell 200 in the column such that the word-line WL-0 210 controls the first memory cell, WL-1 210 controls the next memory cell, and so on, up until the last memory cell which is controlled by the word-line WL(n–1) 210. The column also includes the pair of bitlines BL 240 and BL' 250 which are driven by the bitline drivers 292A and 292B. A write-enable signal line WE 246 is coupled to each of the bitline drivers 292A and 292B which causes the bitline drivers to assert the bitlines BL 240 and BL' 250 during a write operation to write the value on the Data In line 248 into whichever memory cell has its respective word-line turned on. (The Data In' line 249 is the inverse of the Data In line 248.) In the case of a read operation, the read-enable signal line RE 242 is asserted instead of the write-enable line 246. The RE 242 signal causes the bitlines BL 240 and BL' 250 to pick up the value from whichever memory cell has its respective word-line turned on, and the sense-amp 290 then reads the value from the pair of bitlines. Each column 201 in the memory array 202 may be designed similarly as shown in FIG. 3.

Certain properties of the memory array design illustrated in FIGS. 2 and 3 may make it difficult for conventional static timing analysis tools to analyze the timing requirements of the memory array. For example, data values can flow across the passgate transistors 220 and 230 bi-directionally, depending on whether a read operation is being performed to read the data value from the memory cell or a write operation is being performed to write a data value into the memory cell. This bi-directional nature of the circuitry, as well as the non-linearity of the paths through the array and the differential circuitry used in the sense-amps, may present difficulties for a conventional static timing analysis tool to handle.

Figure 4:
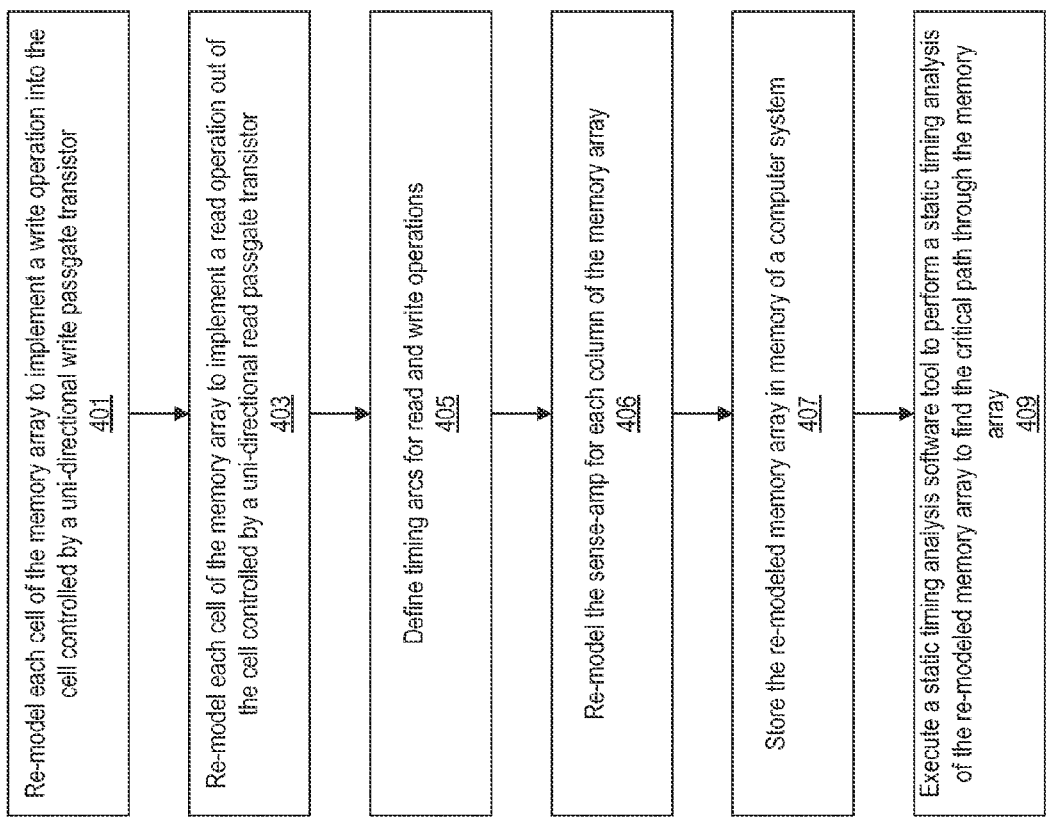
FIG. 4 is a flowchart diagram illustrating one embodiment of a method for re-modeling the memory array so that a static timing analysis can be performed on the memory array.

FIG. 4 is a flowchart diagram illustrating one embodiment of a method for re-modeling a memory array so that a static timing analysis can be performed on the memory array. Each cell of the memory array may be re-modeled, e.g., to change the cell from the circuit design shown in FIG. 2 to a different design more suitable for a static timing analysis. The changed memory cell design may eliminate properties such as the bi-directional passgate transistors in the original memory cell design.

In some embodiments each memory cell may be re-modeled such that write operations for writing data into the memory cell are controlled by a uni-directional write passgate transistor, as indicated in block 401 of the flowchart of FIG. 4. Each memory cell may also be re-modeled such that read operations for reading data from the memory cell are controlled by a uni-directional read passgate transistor, as indicated in block 403 of the flowchart. The memory cell model used in the re-modeled memory array may in effect split the memory cell into two sides, where one side is used for read operations and is controlled by the uni-directional read passgate transistor, and the other side is used for write operations and is controlled by the uni-directional write passgate transistor. As indicated in block 405, the re-modeled memory cell (or a static timing analysis tool that analyzes the re-modeled memory cell) may also be configured with information defining timing arcs for read and write operations on the memory cell.

Figure 5:
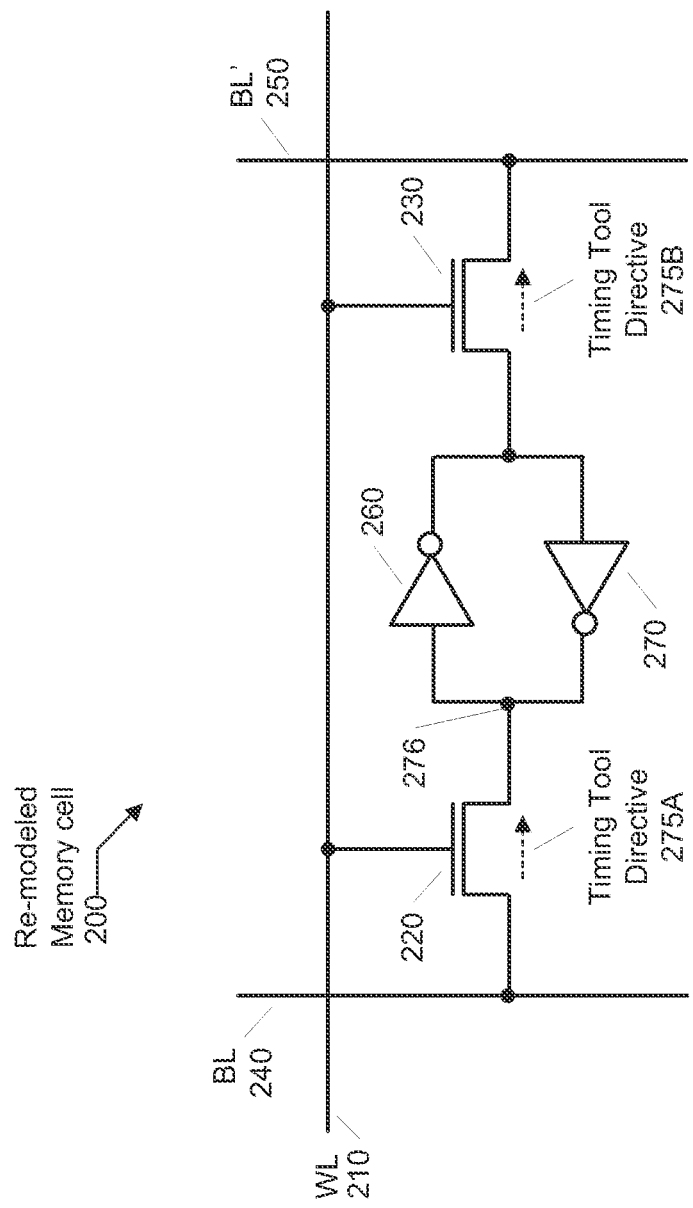
FIGS. 5 and 6 illustrate embodiments of a modified memory cell model used for each memory cell of the re-modeled memory array.

FIG. 5 illustrates one embodiment of a re-modeled memory cell 200. Timing tool directive information 275A may inform the static timing analysis tool that the transistor 220 is a uni-directional transistor that is used in write operations for writing data into the cell. The static timing analysis tool may also be configured to treat the pair of cross-coupled inverters as a state element (e.g., a latch) so that the timing arc for a write operation into the memory cell ends at the node 276. The timing arc for the write operation may be defined as the time from wordline assertion to data capture at the node 276. Timing tool directive information 275B may inform the static timing analysis tool that the transistor 230 is a uni-directional transistor that is used in a read operation for reading data from the cell. The timing arc for the read operation may be defined as the time from wordline assertion to Q (bitline output).

Figure 6:
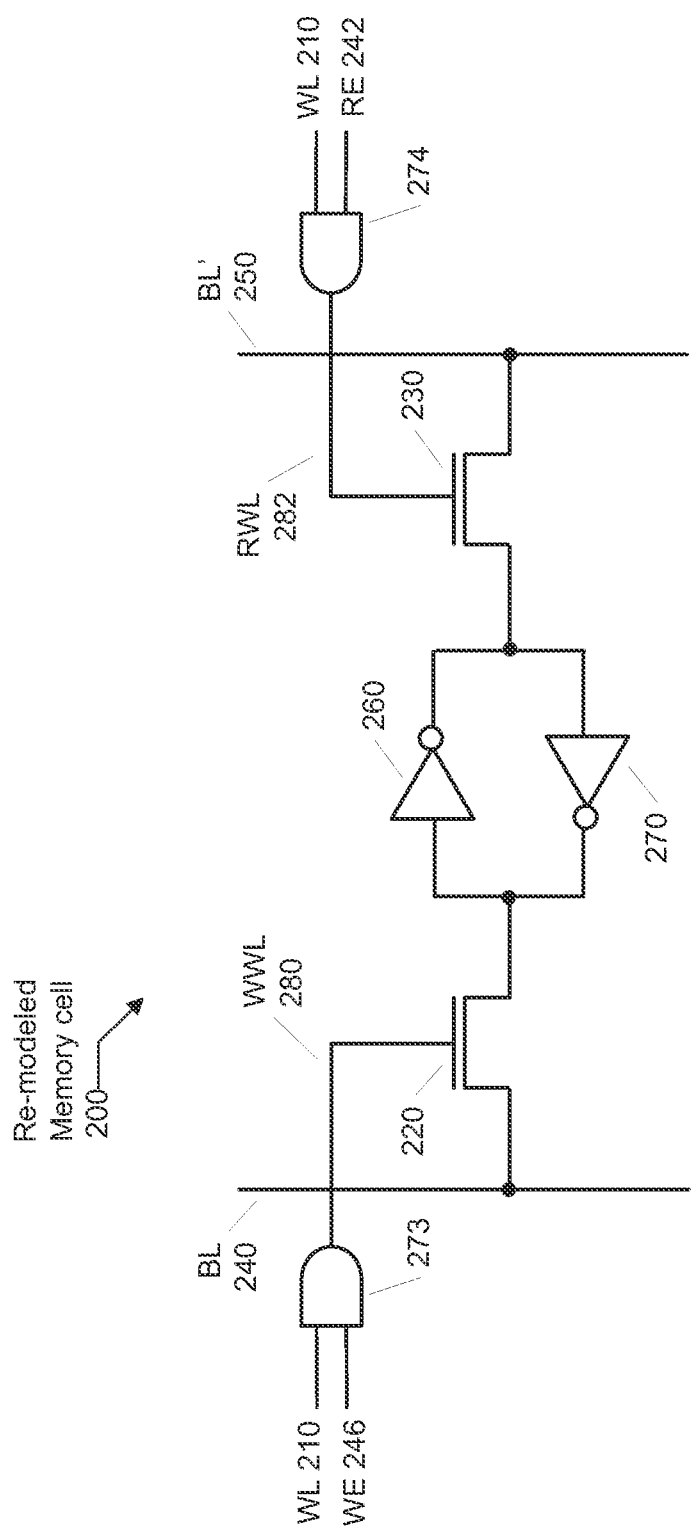

FIG. 6 illustrates an alternative embodiment of a re-modeled memory cell 200. In this alternative embodiment, the memory cell is re-modeled such that write operations for writing data into the memory cell are controlled by a uni-directional write passgate transistor coupled to a write-wordline signal. The write-wordline signal WWL 280 is created from the wordline signal WL 210 for the memory cell and the write-enable signal WE 246 which is asserted during a write operation. The write-wordline signal WWL 280 may be created by passing these two signals through an AND gate 273 so that the write-wordline signal WWL 280 is asserted during write operations to this particular memory cell 200. The write-wordline signal line WWL 280 is connected to the passgate transistor 220 in FIG. 6, which is referred to herein as a write passgate transistor because it controls access to the memory cell for write operations.

Similarly, in some embodiments the memory cell in FIG. 6 is also re-modeled such that read operations for reading data from the memory cell are controlled by a uni-directional read passgate transistor coupled to a read-wordline signal. The read-wordline signal RWL 282 is created from the wordline signal WL 210 for the memory cell and the read-enable signal RE 242 which is asserted during a read operation. The read-wordline signal RWL 282 may be created by passing these two signals through an AND gate 274 so that the read-wordline signal RWL 282 is asserted during read operations to this particular memory cell 200. The read-wordline signal line RWL 282 is connected to the passgate transistor 230 in FIG. 6, which is referred to herein as a read passgate transistor because it controls access to the memory cell for read operations.

When the wordline WL 210 for the memory cell is asserted, only one of the passgate transistors will be activated. If data is being written into the memory cell then the write-enable signal WE 246 will be asserted together with the wordline signal WL 210, thus causing the write-wordline signal WWL 280 to be asserted to activate the write passgate transistor 220. The read passgate transistor 230 will not be activated since the read-enable signal RE 242 remains turned off during the write operation, which causes the read-wordline signal RWL 282 to remain turned off. Thus, during the write operation, the signal flows in one direction across the write passgate transistor 220 into the memory cell to write the data value into the memory cell. Signals do not flow across the read passgate transistor 230 in either direction since it remains turned off.

If data is being read from the memory cell then the read-enable signal RE 242 will be asserted together with the word-line signal WL 210, thus causing the read-wordline signal RWL 282 to be asserted to activate the read passgate transistor 230. The write passgate transistor 220 will not be activated since the write-enable signal WE 246 remains turned off during the read operation, which causes the write-wordline signal WWL 280 to remain turned off. Thus, during the read operation, the signal flows in one direction across the read passgate transistor 230 from the memory cell to read the data value from the memory cell. Signals do not flow across the write passgate transistor 220 in either direction since it remains turned off.

Figure 7:
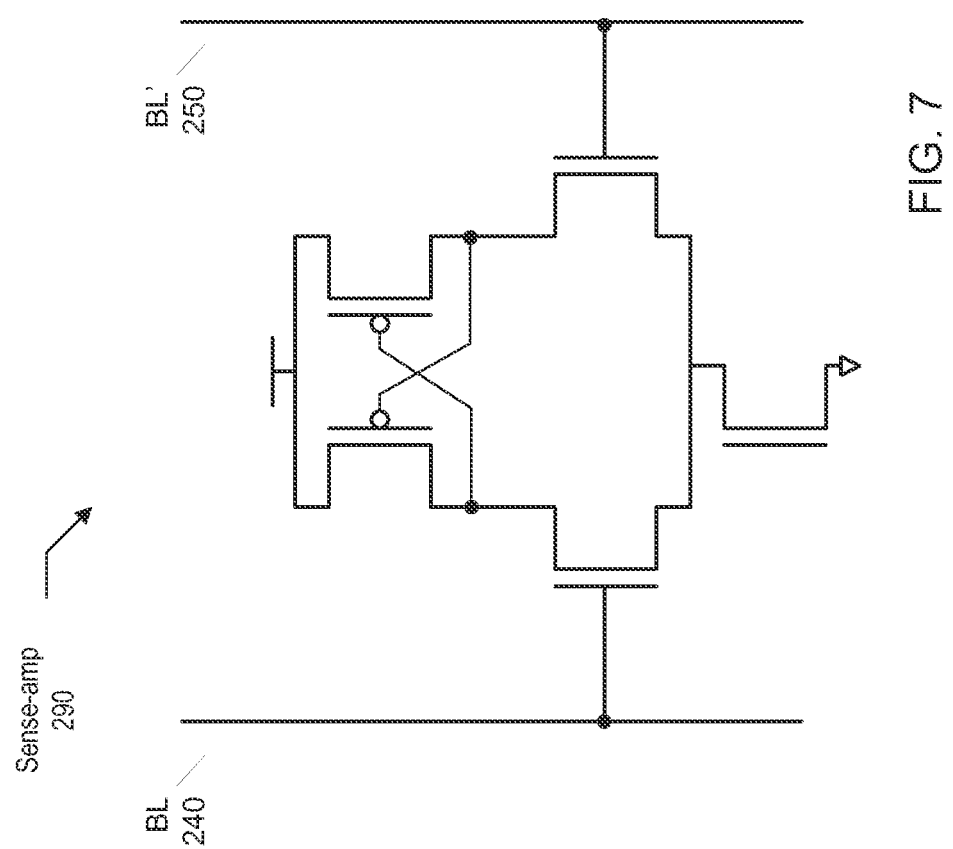
FIG. 7 illustrates an example of conventional circuitry for a sense-amp of the memory array.

In some embodiments the sense-amps in the memory array may also be re-modeled, as indicated in block 406 of FIG. 4. FIG. 7 illustrates an example of conventional sense-amp circuitry for the sense-amp for a given column of the memory array. The sense-amp may function as a differential amplifier that senses the difference in the pair of bitlines for the column in order to read the bit value for the column. The sense-amp uses a pair of NMOS transistors with gates coupled to the bit lines BL 240 and BL' 250 respectively. Whichever bit line BL 240 or BL' 250 discharges in response to the read bit will cause the corresponding the corresponding NMOS transistor current to decrease as compared to the other NMOS transistor. The cross-coupled PMOS transistors also aid in amplifying the difference, such that the output of the sense-amp 290 is a full-swing digital signal. Conventional static timing analysis tools may not be able to correctly analyze the circuitry that implements the sense-amp. Thus, in some embodiments the sense-amp for each column of the memory array may also be re-modeled to change the circuitry that implements each sense-amp into a form that can be better analyzed by a static timing analysis tool.

Figure 8:
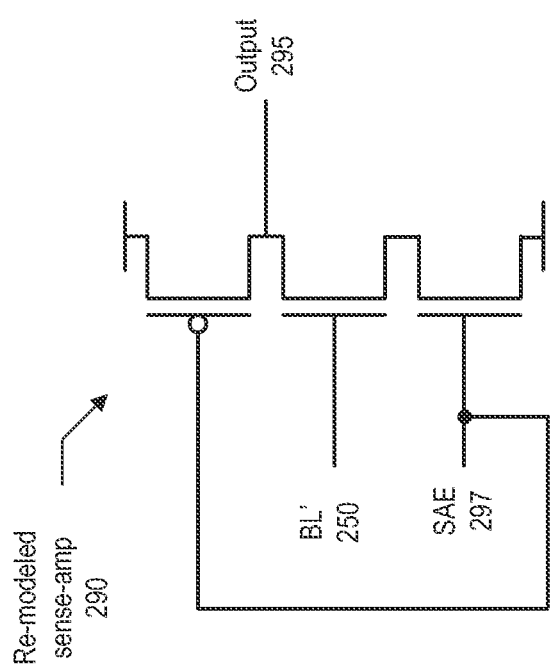
FIG. 8 illustrates one embodiment of a modified sense-amp model used for each sense-amp of the re-modeled memory array.

FIG. 8 illustrates one embodiment of a changed model for a sense-amp 290 for a given column of the memory array. The changed model of the sense-amp 290 uses a dynamic logic gate or domino logic gate 295. A sense-amp enable signal line SAE 297 may be connected to one of the N-transistors of the domino logic gate 295. The sense-amp enable signal line SAE 297 is the same as the read-enable signal RE 242 for the memory array, except that it is put through a delay chain so that it arrives at the sense-amp 290 after a delay. The bitline signal BL' 250 may be connected to another of the N-transistors of the domino logic gate 295. During the read operation, the bitline signal BL' 250 picks up the opposite value from the value stored in the memory cell. Thus, if the cell value is a "0" then the bitline signal BL' 250' will have a value of "1", and when the sense-amp enable signal line SAE 297 is asserted, the output signal line 295 will get a value of "0". Similarly, if the cell value is a "1" then the bitline signal BL' 250 will have a value of "0", and when the sense-amp enable signal line SAE 297 is asserted, the output signal line 295 will get a value of "1".

In some embodiments the sense-amp enable signal line SAE 297 may also be connected to the P-transistor of the domino logic gate 295 to pre-charge it before the bitline signal BL' 250 signal is ready at the sense-amp 290, e.g., while the wordline is being decoded and asserted. In other embodiments a separate pre-charge signal may be used to implement the pre-charge instead of the sense-amp enable signal line SAE 297.

The original circuit design for the sense-amps of the memory array uses both of the bitline signals BL 240 and BL' 250. Both of these bitline signals are coupled to the same memory cell, and thus signals flow out of the memory cell in two directions and into the sense-amp from both of these sources. This bi-directional circuitry based on differential bitline signals may be difficult for a conventional static timing analysis tool to analyze. Changing the circuitry in the re-modeled memory array so that only the bitline signal BL' 250 is used in the sense-amp for each column as shown in FIG. 8 may enable a static timing analysis tool more accurately perform a static timing analysis, e.g., since the circuitry has been changed to uni-directional circuitry.

Thus, a changed or re-modeled memory array may be created by re-modeling each memory cell and sense-amp used in the original memory array as described above. Although the bi-directional passgate transistors in the original memory cell design may be changed to uni-directional passgate transistors in the changed memory cell model, the model may still be difficult for some conventional static timing analysis tools to analyze. In some embodiments the static timing analysis tool may need to be provided with additional information that enables the changed memory array to be properly analyzed, e.g., by configuring the changed memory array model and/or the static analysis timing tool itself with information indicating how to analyze the timing of the changed memory array model. In some embodiments, timing paths for the re-modeled memory array may be defined, as discussed above with reference to block 405 of FIG. 4. The static timing analysis tool may be configured with information specifying that signals flow only in one direction across the write passgate transistor 220, as well as information specifying that the read passgate transistor 230 will not be activated when the write passgate transistor 220 is active. The write side of the memory cell may thus appear to operate similarly as a latch. Similarly, the static timing analysis tool may be configured with information specifying that signals flow only in one direction across the read passgate transistor 230.

As indicated in block 407, the re-modeled memory array may be stored in memory of a computer system. A software tool may then be executed on the computer system to perform a static timing analysis of the re-modeled memory array in order to find the critical path through the memory array. The static timing analysis performed in block 407 may be referred to as a transistor-level static timing analysis since the memory array is modeled at the transistor-level.

While all of the cells in the memory array may use the same basic circuitry model to implement read and write operations, there may be variations in the memory cells, e.g., caused by wiring which connects the memory array to other components in a higher-level circuit or other wiring differences for particular memory cells. The static timing analysis tool may determine the critical path through the memory array based not only on the timing delays of the transistors used in the memory array circuitry, but also based on delay caused by parasitic capacitance that appears in memory cells from nearby wiring.

The memory array model may be re-modeled for the purpose of performing the static timing analysis to find the critical path, but the original design may be used to build the actual memory array. This means that the delay time determined for the critical path may not be accurate since the changed properties of the re-modeled memory array result in different timing characteristics. However, since all of the memory cells and sense-amps are re-modeled in the same way, the static timing analysis tool may still be able to correctly identify the critical path itself.

Figure 9:
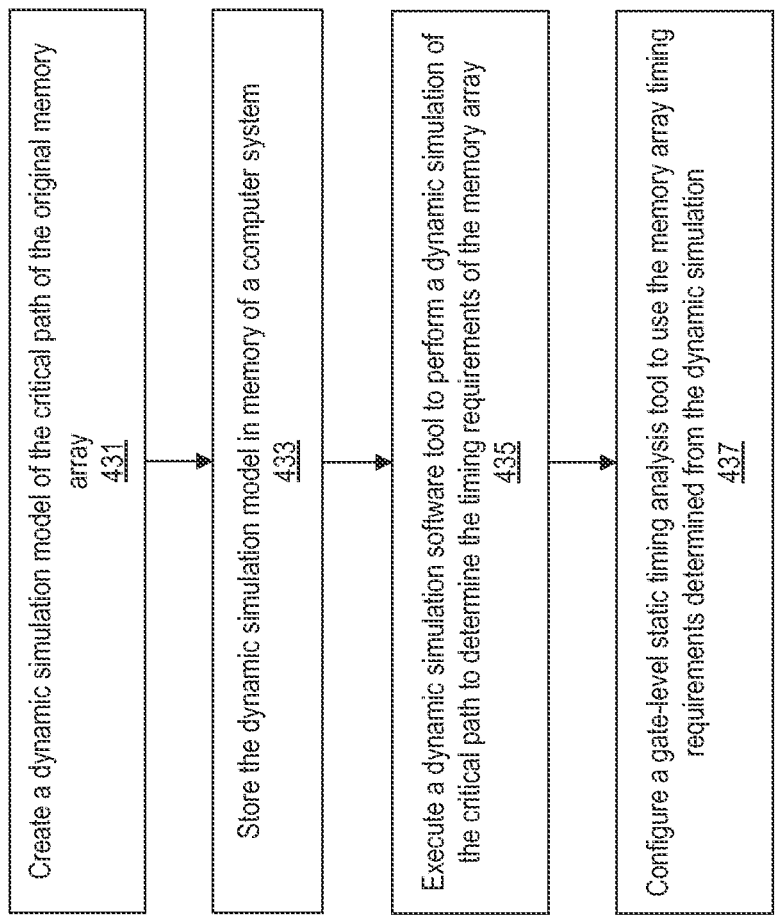
FIG. 9 is a flowchart diagram illustrating a method for determining the actual timing requirements of the original memory array based on the results of the static timing analysis performed on the re-modeled memory array.

Once the critical path has been found using the re-modeled memory array, further embodiments of the method may involve using the critical path to find the real timing requirements of the original memory array, as illustrated in the flowchart of FIG. 9. As indicated in block 431, a dynamic simulation model of the critical path of the original memory array may be created based on the original circuit design. As indicated in blocks 433 and 435, the dynamic simulation model may be stored in memory of a computer system, and a dynamic simulation tool (such as Spice for example) may be executed to perform a dynamic simulation to simulate the operation of the circuitry used in the critical path of the memory array. Other memory array circuitry not used in the critical path may be omitted from the model. While it may not be possible or practical to perform a dynamic simulation of the entire memory array, the circuitry of only the critical path may be small enough and simple enough to perform a dynamic simulation. Since the dynamic simulation is based on the original (real) circuitry of the memory array, the real timing requirements of the critical path can be accurately determined from the dynamic simulation.

Since the critical path is the path of maximum delay through the memory array, the timing requirements for the whole memory array may be the same as the timing requirements of the critical path. In further embodiments of the method, the timing requirements determined from the dynamic simulation may be used to perform a timing analysis of a higher-level circuit in which the memory array is used. For example, as indicated in block 437, a gate-level static timing analysis tool may be configured to use the memory array timing requirements determined from the dynamic simulation. In the gate-level static timing analysis, the memory array may be modeled as a "black box". For example, the gate-level static timing analysis tool may not know about and may not analyze the actual circuitry of the memory array, but may instead simply use the memory array timing requirements previously determined from the dynamic simulation to determine the delay time for paths in the circuit that pass through the memory array.

In various embodiments the higher-level circuit that uses the memory array may be any kind of circuit. In some embodiments the circuit may be an integrated circuit (IC) or system-on-a-chip (SoC). The circuit may be used in any type of system or product. For example, in some embodiments the circuit may be used in a mobile phone or other handheld electronic device.

FIGS. 5, 6 and 8 illustrate particular embodiments of a memory cell model and sense-amp model that can be used to model the memory array so as to enable a static timing analysis tool to determine the critical path, and alternative embodiments of the memory cell model and sense-amp model are contemplated. In general, the model of the memory array may replace bi-directional circuitry used in the original circuit design with uni-directional circuitry. The memory cell model may have various forms that use uni-directional passgate transistors instead of bi-directional passgate transistors. The memory cell model may also have various forms such that read operations (but not write operations) are performed on one side of the memory cell (e.g., on one side of the cross-coupled inverters that store the cell value), and write operations (but not read operations) are performed on the other side of the memory cell. The sense-amp model may also have various forms that uses only one of the bitline signals in the pair of bitline signals for a given column.

Figure 10:
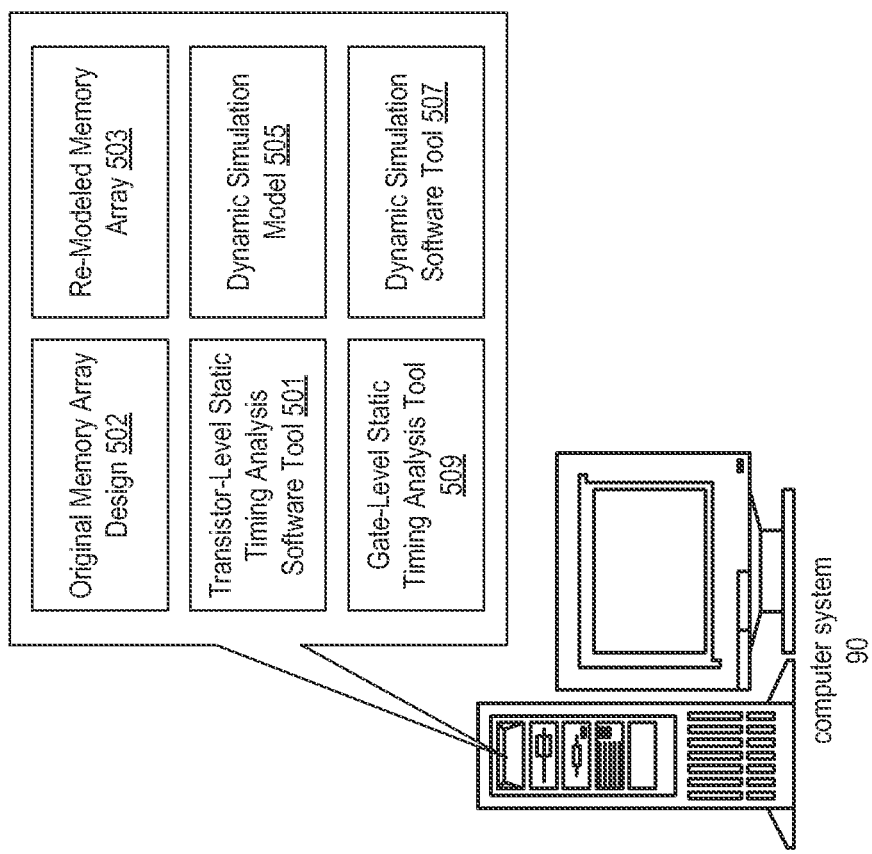
FIG. 10 illustrates an example of a computer system configured to store data and execute software to implement various aspects of the methods described herein.

FIG. 10 illustrates an example of a computer system 90 configured to store data and execute software to implement various aspects of the methods described above. In various embodiments the computer system 90 may be of any type, such as a personal computer system (PC), workstation, network appliance, distributed computer system, handheld device, or other computing device or combinations of devices. In general, the term "computer system" can be broadly defined to encompass any device (or combination of devices) having at least one processor that executes instructions from one or more storage mediums.

In some embodiments the computer system 90 may store an original memory array design 502 and a re-modeled memory array 503, e.g., where the original memory array design uses original memory cell circuitry such as illustrated in FIG. 2, and the re-modeled memory array 503 uses a changed memory cell model such as illustrated in FIG. 6. The computer system 90 may also store and/or execute a transistor-level static timing analysis software tool 501 configured to perform a transistor-level static timing analysis on the re-modeled memory array 503 to determine the critical path through the memory array. In some embodiments the transistor-level static timing analysis software tool 501 may be configured to automatically create the re-modeled memory array 503 from the original memory array design 502, or the computer system 90 may execute other software that can automatically create the re-modeled memory array 503. In other embodiments, a circuit designer may manually perform at least some of steps involved in creating the re-modeled memory array 503. For example, the circuit designer may manually create or specify the changed memory cell model, and then a software tool may automatically apply the changed memory cell model to each cell of the memory array.

Once the critical path has been determined, a dynamic simulation model 505 may be created and stored on the computer system 90, where the dynamic simulation model 505 models the real circuit design of the original memory array that is used in the critical path. In some embodiments the dynamic simulation model 505 may be manually created by the circuit designer, but the dynamic simulation model 505 may also be at least partially created automatically in some embodiments. The dynamic simulation software tool 507 may execute to perform a dynamic transistor-level simulation based on the dynamic simulation model 505 in order to accurately determine the actual timing requirements of the memory array. The timing requirements determined by the dynamic simulation software tool 507 may then be used by a gate-level static timing analysis tool 509 to perform a gate-level static timing analysis of a higher-level circuit that uses the original memory array, e.g., where the memory array is simply modeled as a black box in the gate-level static timing analysis.

In other embodiments different computer systems may be used to implement different aspects of the methods described above. Thus, for example, the transistor-level static timing analysis software tool 501 may be executed on one computer system, and the gate-level static timing analysis tool 509 may be executed on another computer system.

Figure 11:
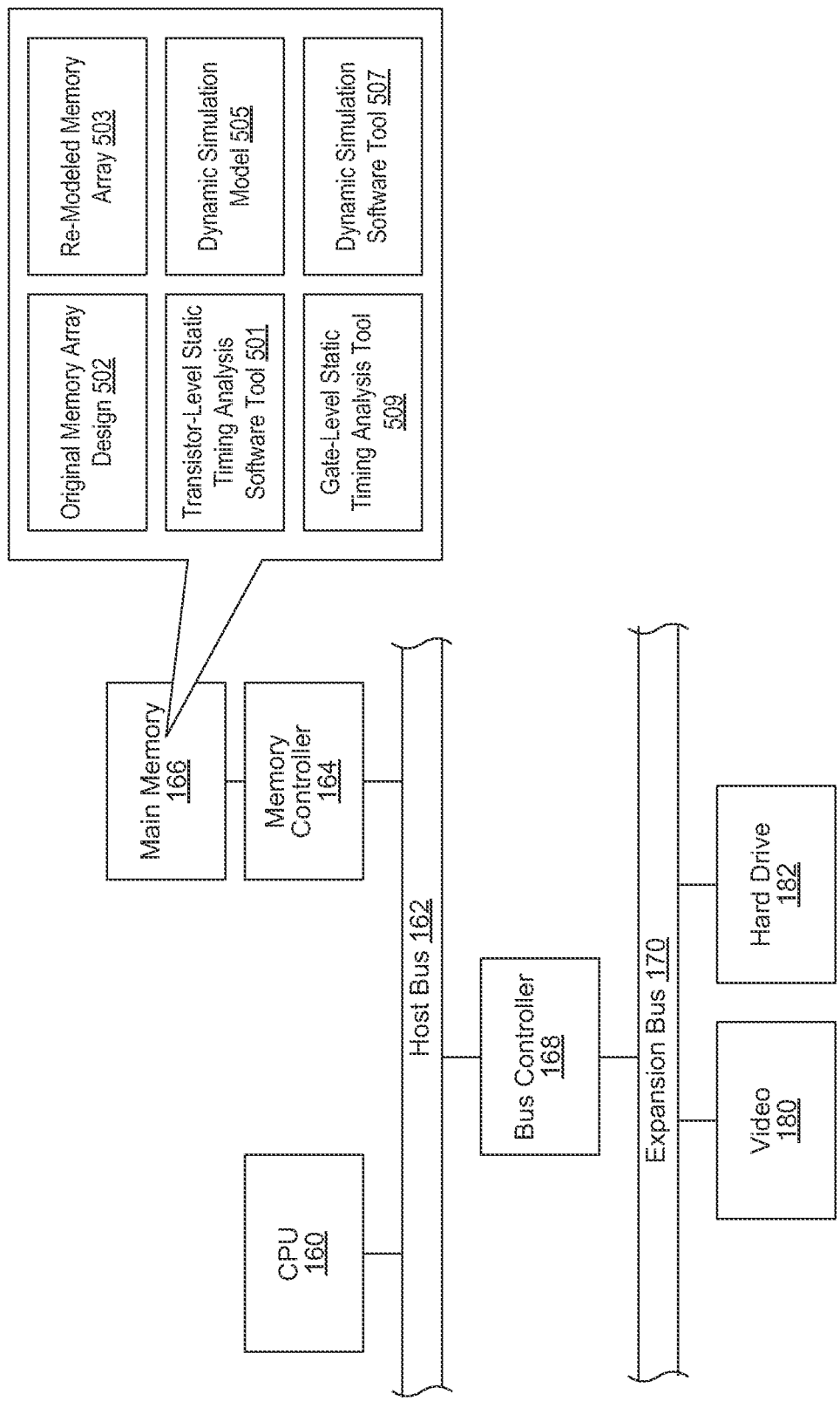
FIG. 11 is a more detailed illustration of the computer system of FIG. 8 according to one embodiment.

FIG. 11 is a more detailed illustration of the computer system 90 according to one embodiment. It is noted that in other embodiments the computer system 90 may have any other configuration or architecture, and FIG. 11 illustrates a representative PC embodiment. It is also noted that the computer system 90 may be a general purpose desktop computer system, a computer implemented on a card installed in a chassis, or other types of embodiments. Elements of a computer not necessary to understand the present description have been omitted for simplicity.

The computer system 90 may include at least one central processing unit or CPU (processor) 160 which is coupled to a processor or host bus 162. The CPU 160 may be any of various types. For example, in some embodiments, the processor 160 may be compatible with the x86 architecture, while in other embodiments the processor 160 may be compatible with the SPARC™ family of processors. Also, in some embodiments the computer system 90 may include multiple processors 160.

The computer system 90 may also include memory 166 in which program instructions and data are stored. In some embodiments the memory 166 may include one or more forms of random access memory (RAM) such as dynamic RAM (DRAM) or synchronous DRAM (SDRAM). In other embodiments, the memory 166 may include any other type of memory configured to store program instructions and data. In some embodiments the memory 166 may store software and/or data described above with reference to FIG. 10, such as the original memory array design 502, re-modeled memory array 503, transistor-level static timing analysis software tool 501, dynamic simulation model 505, gate-level static timing analysis tool 509, and/or dynamic simulation software tool 507. The memory 166 may also store operating system software or other software used to control the operation of the computer system 90. The memory controller 164 may be configured to control the memory 166.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. Various devices may be coupled to the expansion or input/output bus 170, such as a hard disk drive 182 which stores information in a non-volatile manner, as well as a video display subsystem 180 which sends video signals to a display device.

Figure 12:
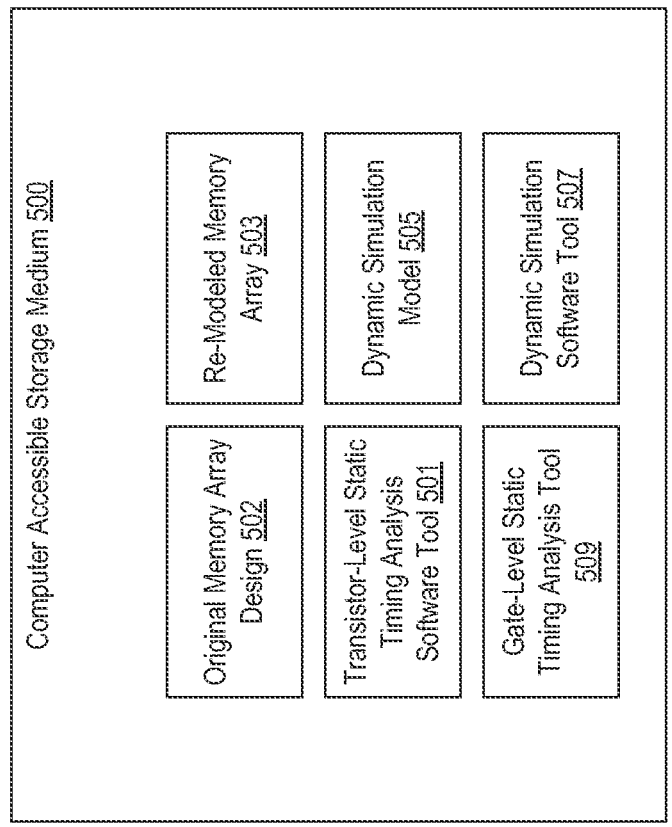
FIG. 12 is a block diagram of a computer accessible storage medium storing program instructions and data.

Turning now to FIG. 12, a block diagram of a computer accessible storage medium 500 is shown. The computer accessible storage medium 500 may store program instructions and/or data that implements the original memory array design 502, re-modeled memory array 503, transistor-level static timing analysis software tool 501, dynamic simulation model 505, gate-level static timing analysis tool 509, and/or dynamic simulation software tool 507. The program instructions may be executable by one or more processors to perform the functions of the various software tools described above. Generally, the computer accessible storage medium 500 may store any set of instructions which, when executed, implement a portion or all of the functions described herein of the various software tools.

Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, a flash memory interface (FMI), a serial peripheral interface (SPI), etc. Storage media may include microelectromechanical systems (MEMS), as well as storage media accessible via a communication medium such as a network and/or a wireless link. A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. A method comprising:
modeling a memory array using a first model, wherein modeling the memory array comprises modeling each memory cell of the memory array to include a first uni-directional transistor that controls write operations into the memory cell and a second uni-directional transistor that controls read operations out of the memory cell;
storing the first model of the memory array in memory of a computer system; and
executing software on the computer system to:
perform a transistor-level static timing analysis of the first model of the memory array, wherein performing the transistor-level static timing analysis includes determining a critical path of the memory array;
perform a dynamic simulation on a dynamic simulation model of the critical path of the memory array, wherein the dynamic simulation determines timing requirements for the memory array; and
perform a gate-level static timing analysis of a circuit that uses the memory array, wherein the gate-level static timing analysis uses the timing requirements for the memory array determined from the dynamic simulation.

2. The method of claim 1,
wherein the first transistor does not control read operations out of the memory cell; and
wherein the second transistor does not control write operations into the memory cell.

3. The method of claim 1,
wherein the first transistor and the second transistor are both uni-directional pass-gate transistors.

4. The method of claim 1,
wherein modeling the memory array further comprises modeling each sense-amp of the memory array as a domino logic gate.

5. The method of claim 1, further comprising:
creating the dynamic simulation model of the critical path of the memory array, wherein the dynamic simulation model is based on a design of the memory array.

6. A non-transitory computer accessible storage medium storing:
first information representing a memory array, wherein each memory cell of the memory array includes a first uni-directional transistor that controls write operations into the memory cell and a second uni-directional transistor that controls read operations out of the memory cell; and
program instructions executable by one or more processors to:
analyze the first information to perform a transistor-level static timing analysis of the memory array, wherein performing the transistor-level static timing analysis includes determining a critical path of the memory array;
determine timing requirements of the memory array based on the critical path of the memory array; and
perform a gate-level static timing analysis of a circuit that uses the memory array, wherein the gate-level static timing analysis uses the timing requirements of the memory array.

7. The non-transitory computer accessible storage medium of claim 6,
wherein the first transistor does not control read operations out of the memory cell; and wherein the second transistor does not control write operations into the memory cell.

8. The non-transitory computer accessible storage medium of claim 6,
wherein the first information representing the memory array includes information representing a plurality of sense-amps of the memory array, wherein each sense-amp is represented as a domino logic gate.

9. The non-transitory computer accessible storage medium of claim 8,
wherein the plurality of sense-amps includes a first sense-amp for a first column of the memory array;
wherein the first information includes information representing a pair of bitline signals for the first column and information representing one of the bitline signals coupled to the domino logic gate of the first sense-amp, wherein the other bitline signal is not used in the representation of the first sense-amp.

10. The non-transitory computer accessible storage medium of claim 8,
wherein the plurality of sense-amps includes a first sense-amp for a first column of the memory array;
wherein the first information includes information representing a sense-amp enable signal coupled to the domino logic gate of the first sense-amp, wherein the sense-amp enable signal is a delayed version of a read-enable signal for the memory array.

11. The non-transitory computer accessible storage medium of claim 6, further storing:
second information representing the memory array, wherein the second information represents the memory array according to a memory cell circuit design, and wherein the first information represents the memory array according to a modified model of the memory cell circuit design.

12. A system comprising:
one or more processors; and
memory storing first information representing a memory array, wherein each memory cell of the memory array includes a first transistor controlled by a read-wordline signal and a second transistor controlled by a write-wordline signal, wherein the first transistor controls read operations on the memory cell and the second transistor controls write operations on the memory cell;
wherein the memory further stores program instructions executable by the one or more processors to:
analyze the first information to perform a transistor-level static timing analysis of the memory array, wherein performing the transistor-level static timing analysis includes determining a critical path of the memory array;
perform a dynamic simulation of the memory array based on the critical path of the memory array, wherein the dynamic simulation determines timing requirements for the memory array; and
perform a gate-level static timing analysis of a circuit that includes the memory array, wherein the gate-level static timing analysis uses the timing requirements for the memory array determined from the dynamic simulation.

13. The system of claim 12,
wherein the first transistor does not control write operations on the memory cell; and
wherein the second transistor does not control read operations on the memory cell.

14. The system of claim 12,
wherein the memory further stores second information representing the memory array, wherein the second information represents the memory array according to a memory cell circuit design, and wherein the first information represents the memory array according to a modified model of the memory cell circuit design.

15. A method comprising:
creating a model of a memory array, wherein creating the model comprises modeling each memory cell of the memory array to include a first uni-directional transistor that controls write operations into the memory cell and a second uni-directional transistor that controls read operations out of the memory cell;
storing the model of the memory array in memory of a computer system;
executing software on the computer system to perform a transistor-level static timing analysis of the model of the memory array, wherein performing the transistor-level static timing analysis of the model of the memory array determines a critical path through the memory array;
creating a dynamic simulation model of the critical path through the memory array, wherein the dynamic simulation model is based on a circuit design of the memory array;
performing a dynamic simulation on the dynamic simulation model of the critical path, wherein performing the dynamic simulation determines timing requirements for the memory array; and
performing a gate-level static timing analysis of a circuit that uses the memory array, wherein the gate-level static timing analysis uses the timing requirements for the memory array determined by the dynamic simulation.

16. The method of claim 15,
wherein the circuit design of the memory array specifies memory cells having bi-directional passgate transistors;
wherein the first transistor and the second transistor used in the memory cells of the model are unidirectional passgate transistors.

17. The method of claim 15,
wherein the circuit design of the memory array specifies a first memory cell having a plurality of passgate transistors used during both read and write operations;
wherein the first transistor used in each memory cell of the model is a passgate transistor used during write operations on the memory cell, but not read operations;
wherein the second transistor used in each memory cell of the model is a pass-gate transistor used during read operations on the memory cells, but not write operations.

18. The method of claim 15,
wherein performing the static timing analysis of the model of the memory array comprises performing a transistor-level static timing analysis.

19. A method comprising:
modeling a memory array using a first model, wherein the memory array has a circuit design that uses bi-directional circuitry, wherein the first model replaces the bi-directional circuitry with uni-directional circuitry;
storing the first model of the memory array in memory of a computer system; and
executing software on the computer system to:
perform a transistor-level static timing analysis of the first model of the memory array, wherein performing the transistor-level static timing analysis includes determining a critical path of the memory array;

determine timing requirements of the memory array based on the critical path of the memory array; and perform a gate-level static timing analysis of a circuit that includes the memory array, wherein the gate-level static timing analysis uses the timing requirements of the memory array.

20. The method of claim 19, wherein the circuit design of the memory array specifies a memory cell including a pair of bi-directional transistors;

wherein the first model replaces the pair of bi-directional transistors with a pair of uni-directional transistors.

21. The method of claim 19, wherein the circuit design of the memory array specifies a memory cell including a pair of transistors that are used during both read operations and write operations on the memory cell;

wherein the first model replaces the pair of transistors with:

a first transistor that is used during write operations on the memory cell, but not read operations; and a second transistor that is used during read operations on the memory cell, but not write operations.

22. The method of claim 19, wherein the circuit design of the memory array specifies a first bitline signal coupled to a first side of a memory cell and a second bitline signal coupled to a second side of the memory cell, wherein the first bitline signal and the second bitline signal are both used to implement read and write operations on the memory cell;

wherein the first model uses a different circuit design in which:

the first bitline signal is used to implement a read operation on the first side of the memory cell, wherein the read operation does not use the second bitline signal; and the second bitline signal is used to implement a write operation on the second side of the memory cell, wherein the write operation does not use the first bitline signal.

23. The method of claim 19, wherein the circuit design of the memory array specifies a sense-amp that uses both bitline signals of a pair of bitline signals to detect a value of a memory cell;

wherein the first model uses a different circuit design in which the sense-amp uses only one of the bitline signals to detect the value of the memory cell.

* * * * *